United States Patent [19]

Spevack

[11] 4,202,864
[45] * May 13, 1980

[54] PROCESS FOR CONTROLLING ENVIRONMENTAL POLLUTION FROM STEAM CONTAINING HYDROGEN SULFIDE

[75] Inventor: Jerome S. Spevack, New Rochelle, N.Y.

[73] Assignee: Deuterium Corporation, New Rochelle, N.Y.

[*] Notice: The portion of the term of this patent subsequent to Oct. 31, 1995, has been disclaimed.

[21] Appl. No.: 938,942

[22] Filed: Sep. 1, 1978

[51] Int. Cl.$^2$ .......................... F22G 1/00; F03G 7/02; C01B 17/16; C01B 31/20

[52] U.S. Cl. ................................. 423/220; 122/459; 60/641; 423/566; 423/561 R; 423/234; 423/232; 423/563

[58] Field of Search .................... 423/563, 561 R, 220, 423/210, 224, 225, 237, 232, 234, 235, 522, 561, 577; 159/16; 23/273 AH; 60/641; 55/73; 210/42 R, 52, 69, 62 R

[56] References Cited

U.S. PATENT DOCUMENTS

| | | | |
|---|---|---|---|
| 1,108,705 | 8/1914 | Cobb | 423/566 |
| 1,597,964 | 8/1926 | Gluud | 423/220 |
| 2,019,468 | 10/1935 | Bacon | 423/225 |
| 2,378,689 | 6/1945 | Collins | 423/230 |
| 3,761,569 | 9/1973 | Heiba et al. | 423/224 |
| 3,789,113 | 1/1974 | Thayer | 423/580 |
| 3,888,974 | 6/1975 | Stevens | 433/580 |
| 4,062,663 | 12/1977 | Spevack | 55/238 |
| 4,123,506 | 10/1978 | Spevack | 423/220 |

FOREIGN PATENT DOCUMENTS 768409 11/1971 Belgium .............................. 423/DIG. 2

Primary Examiner—O. R. Vertiz
Assistant Examiner—Gary P. Straub
Attorney, Agent, or Firm—Hall & Houghton

[57] ABSTRACT

Certain impure steams, especially those from geothermal sources, are polluted with hydrogen sulfide, ammonia, carbon dioxide, other gases, and finely divided particulate solid matter in a form resembling dust or smoke. These contaminants reduce the efficiency of the steam as a heat transfer fluid, are detrimental to equipment utilizing steam as an energy source, and result in environmental pollution or expensive requirements for limiting the same. By the invention herein so polluted steam is selectively processed in the gaseous state upstream of said equipment to remove hydrogen sulfide therefrom, with or without removing other pollutants, to reduce environmental pollution from effluents thereof, to recover valuable materials therefrom, and to improve the utility of the steam as an energy source. This is done by contacting a flow of the steam with aqueous liquid reactant media consisting essentially of one or more reactive compounds of certain metals which form solid metal sulfide reaction products and which preferably are electropositive with respect to hydrogen. The valuable materials subsequently may be recovered from said media as useful byproducts. The reactant compounds may be recycled and may be regenerated from the metal sulfide reaction products.

69 Claims, 14 Drawing Figures

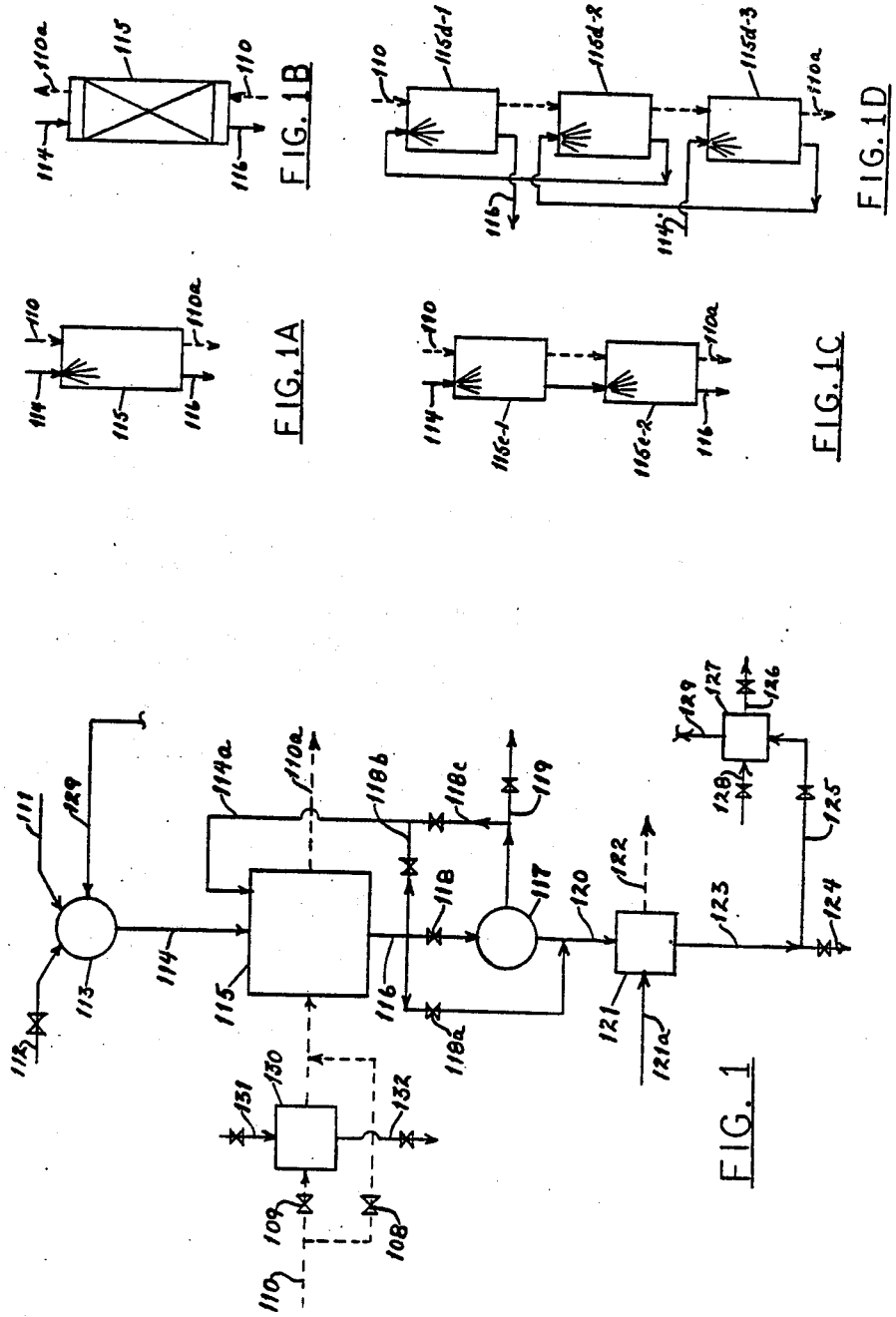

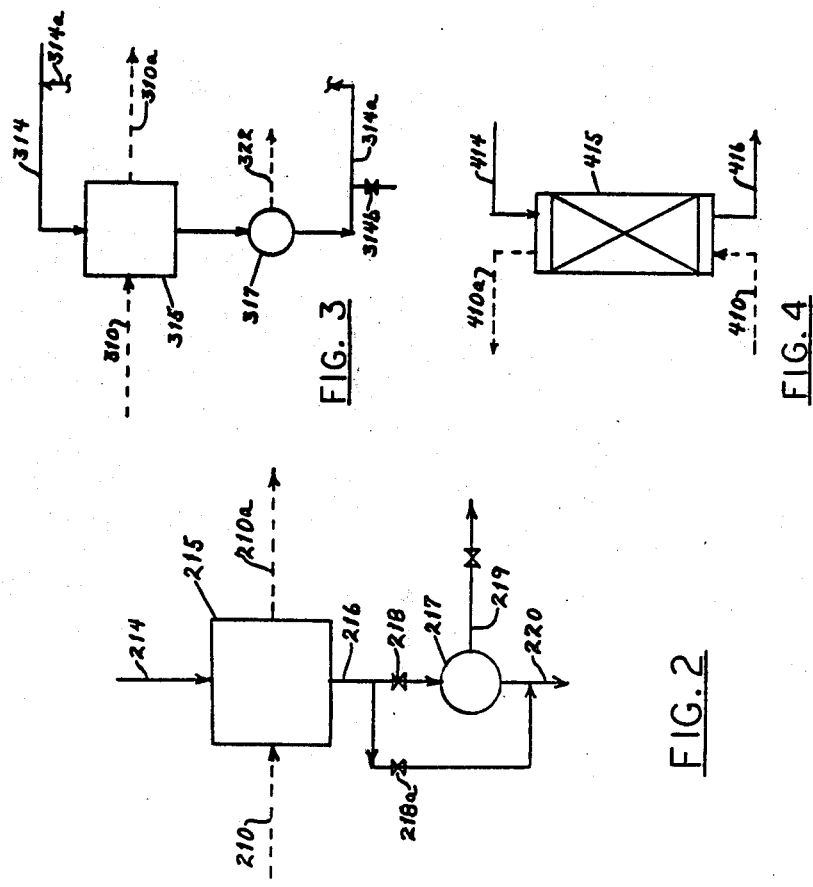

PROCESS FOR CONTROLLING ENVIRONMENTAL POLLUTION FROM STEAM CONTAINING HYDROGEN SULFIDE

This is a division of application Ser. No. 712,170, filed Aug. 6, 1976 now U.S. Pat. No. 4,123,506.

BACKGROUND OF THE INVENTION

1. Field of the Invention

This invention relates to the treatment of impure steam containing a minor proportion of gaseous impurites comprising hydrogen sulfide and more particularly of such steam from a subterraneous source, e.g. geothermal steam, to extract therefrom hydrogen sulfide and other substances contained therein, to improve the utility of the steam as an energy source, to reduce environmental pollution from usage of such steam after such treatment, to recover valuable byproducts and for other purposes.

2. State of the Art

Steam, including geothermal steam, has been utilized to provide heat energy and/or mechanical energy by way of heat exchangers and prime movers, e.g. steam engines and turbines, in systems usually consisting or employing means for condensing the steam from gaseous to liquid phase.

In the use of geothermal steam for such purposes, equipment corrosion and environmental pollution problems have existed because such steam usually contains small proportions of reactive and noxious contaminants including hydrogen sulfide. Hydrogen sulfide, especially in the presence of moisture, is corrosive to a number of metals used in mechanical and electrical equipment. Hydrogen sulfide dissolves in water and forms a solution of hydrosulfuric acid, and in the presence of moist air tends to oxidize and form sulfurous acid and sulfuric acid solutions, and such solutions are strongly corrosive to many metals. Furthermore, hydrogen sulfide is a noxious gas highly detrimental as a pollutant to the environment. Other contaminant substances which may be present in geothermal steam include carbon dioxide, ammonia, methane, hydrogen and nitrogen, substances comprising boron, mercury and arsenic, and solid particulate matter, some of which can contribute to said corrosion and pollution problems. Also, it is often found that the molar quantity of ammonia in geothermal steam exceeds two times the molar quantity of hydrogen sulfide therein.

In practice, geothermal steam driven turbines and relates equipment for producing power have been constructed with special materials intended to resist the corrosive nature of the hydrogen sulfide in the impure geothermal steam and, after use of such steam, the hydrogen sulfide is emitted to the environment causing pollution thereof. Such emission of hydrogen sulfide occurs in part in solution in the cooling water effluent discharged from direct contact condensers and in other part in the noncondensable off-gases effluent from such condensers dischaging into the atmosphere. Reported efforts to abate such environmental pollution have been confined (1) to treatment of the hydrogen sulfide-containing cooling water effluent with air, usually in the presence of a dissolved catalyst, to oxidize the hydrogen sulfide in said effluent to elemental sulfur for subsequent separation and disposal, and (2) to treatment of the hydrogen sulfide containing condenser off-gases to oxidize the hydrogen sulfide therein to sulfur or sulfur dioxide, which oxidized form may then be separated by suitable processing for subsequent disposal. Such hydrogen sulfide pollution abatement practices have been found to be expensive, deal only with environmental aspects of the power plant effluents, create catalyst recovery and waste sulfur materials collection and disposal problems, and fail to take advantage of the ammonia contained in geothermal steam.

SUMMARY OF THE INVENTION

The principal object of the present invention is to depart from practices of treating condenser effluents after condensation of water condensate from contaminated steam in order to control environmental pollution and instead to remove hydrogen sulfide contained in impure steam, e.g. geothermal steam consisting of steam vented from the earth as vapor, steam separated from a mixture of steam and liquid water vented from the earth, and steam flashed from liquid water vented from the earth, prior to its use, e.g. as an energy source, so that effluents therefrom in connection with such use are substantially free of hydrogen sulfide, thus inhibiting or eliminating the enviromental pollution problems otherwise experienced with such effluents other objects are to improve the quality of the steam, and to obtain economic and other advantages, for example, reducing environmental pollution by discharges to the environmental from usage of such steam.

The present invention further recognizes the fact that inpure steam and/or geothermal stem may contain not only hydrogen sulfide but also other contaminants that can cause environmental problems and reduce the utility of steam as an energy source, and aims to improve such utility and to obtain economic and other advantages by extraction of one or more or said other contaminants prior to use of the steam as an energy source. With these objects in mind the invention aims to provide, severally and interdependently, methods or processes applicable for extracting from a flow of impure steam, e.g. geothermal steam, hydrogen sulfide and possibly others of the contaminants contained therein before putting the steam to use, e.g. heating or mechanical equipment, and to effect such extraction with only negligable reduction of the heat content of the steam and with increase in the efficiency of the steam as a medium for transfer of its energy. Said extracting employing the reaction of hydrogen sulfide with a metal compound in aqueous solution to form a solid metal sulfide reaction product.

These objects will be readily understood by reference to approximate analyses of the contaminants present in geothermal steam such as is found in wells in the California area known as "The Geysers". The steam from such a geothermal well may contain about one percent of gaseous contaminants, or may contain greater or lesser amounts thereof. The table below shows reported analyses of the steam from (I) a particular such geothermal well and (II) the overal average of more than 60 such geothermal wells, approximately in parts per million (ppm):

|  | (I) | (II) |
| --- | --- | --- |
| Carbon dioxide | 8000 | 3000 |
| Ammonia | 700 | 500 |
| Hydrogen sulfide | 500 | 500 |
| Methane | 400 | 500 |
| Nitrogen | 300 | 200 |

|  | (I) | (II) |
| --- | --- | --- |
| Hydrogen | 100 | 200 | with less than 100 ppm of other gaseous substances comprising boron, arsenic, mercury and argon. Such geothermal steams also may contain, as another contaminant, finely divided particulate solid matter in a form resembling dust or smoke particles, and as shown by the analyses are essentially devoid of free oxygen.

The presence of noncondensable gases in the steam reduces its efficiency as a heat transfer medium and entails otherwise unnecessary expenditures for power and equipment to accommodate and eject the same. The presence of finely divided particulate matter in the steam causes harmful deposition in, and erosion of, the equipment employing the steam as an energy source.

Other objects of the present invention are to further increase the purity of impure steam by extracting other contaminants therefrom, and/or to recover one or more valuable products or byproducts therefrom, together with improvement of the utility of said steam as an energy source.

Also, the present invention aims to remove in readily separable form by chemical means certain of said contaminants which are chemically reactive, so that they may be recovered as valuable byproducts separate from the nonreactive components, which may then be recovered, if desired, essentially free of contamination by said chemically active contaminants.

In addition, the present invention aims to advantageously employ finely divided particulate material to aid in the removal of hydrogen sulfide, and in this connection to also simultaneously remove from the geothermal steam finely divided particulate solid matter carried thereby to further improve the utility of the steam as an energy source.

As compared with steam conventionally produced from fresh surface waters, geothermal steam, which is produced subterraneously at high temperature and pressure from water far below the surface of the earth, contains higher proportions of the heavy isotopes of the elements of water. The applicant has determined that this isotopic relationship, as well as the natural high temperature of geothermal steam, can be employed in accordance with the present invention to provide a useful feed for heavy water production systems, e.g. as disclosed in copending application Ser. No. 712,171 filed concurrently herewith and herein incorporated by reference, with essentially no detriment to the ability of the geothermal steam to serve as a source of energy as above described and at considerable economic advantage. This further advantage is attained in accordance with the present invention since the pretreatment of the geothermal steam to improve its utility as an energy source may readily be adjusted to also contribute to its utility as a deuterium source for heavy water production at essentially no additional processing cost, with this latter contribution imposing no penalty on the utility of the steam as an energy source.

In brief, various of the foregoing and other objects and advantages are obtained in accordance with this invention as a result of applicant's discoveries that various contaminants present in geothermal steam, and/or deuterium present therein in greater abundance than in fresh surface water, can be transferred at the temperature and pressure of the steam to an aqueous liquid; that certain of said contaminants can be chemically reacted in such aqueous liquid to form substances which may be separated and recovered therefrom; that deuterium in such steam can be readily exchanged for protium from such aqueous liquid at the temperature and pressure of the steam; that such transfers and reactions can take place with essentially no material change other than the improvement of utility of the geothermal steam; and that they can be carried out in a selective manner which enables recovery of such deuterium and/or contaminants in the form of valuable byproduct materials.

The invention is particularly directed to a process by which hydrogen sulfide contained in an impure steam is removed therefrom by contacting the steam with an aqueous dispersion of at least one metal compound which is capable of reacting with the hydrogen sulfide and forming a solid metal sulfide reaction product, for example, an iron, zinc or copper compound, which compound may advantageously be employed alone or in combination with another. Preferred embodiments of the invention employ a compound of a metal which can form a metal sulfide that is capable of reacting with acid to regenerate the said compound and also produce hydrogen sulfide that can be recovered, i.e. of a metal having an electrode oxidation potential positive with respect to hydrogen in the electromotive series, such a compound being, for example, zinc sulfate which can be regenerated from zinc sulfide with production of hydrogen sulfide by reacting the zinc sulfide with sulfuric acid.

The invention will be most readily understood from the following description of preferred embodiments thereof, which are to be deemed illustrative and not restrictive of the invention, the scope of which is pointed out in the appended claims.

SHORT DESCRIPTION OF THE DRAWINGS

In the accompanying drawings in which flow diagrams are set out illustrative of the invention:

FIG. 1 is a flow diagram of a system according to the invention for extracting hydrogen sulfide from a flow of impure steam containing the same, with optical provision for prior extraction of ammonium from said flow, FIGS. 1a, 1b, 1c and 1d, diagrammatically illustrate various elements for contacting steam and liquid employable in the arrangement of FIG. 1, FIG. 2 is a flow diagram illustrating a modification of a part of the system of FIG. 1 for adapting the same to simultaneously extract hydrogen sulfide and ammonia from a flow of steam containing the same, FIG. 3 is a flow diagram illustrating a modification applicable to the systems of FIGS. 1 and 2 for subsequently extracting from the flow of steam effluent from FIG. 1. or FIG. 2, carbon dioxide contained therein, FIG. 4 diagrammatically illustrates a modification applicable to any of the foregoing systems for the extraction of deuterium from the flow of steam effluent therefrom, FIGS. 5 through 8 diagrammatically illustrate modifications, applicable to those of the foregoing systems in which ammonia is extracted from the flow of steam as an ammonium salt solution, for concentrating and recovering the ammonia salt values thereof, the modifications of FIGS. 6, 7 and 8 including heat economizing provisions, FIG. 9 diagrammatically illustrates a modification of the system of FIG. 7, and FIG. 10 diagrammatically illustrates a modification of the system of FIG. 8.

DETAILED DESCRIPTION

Figure 6:
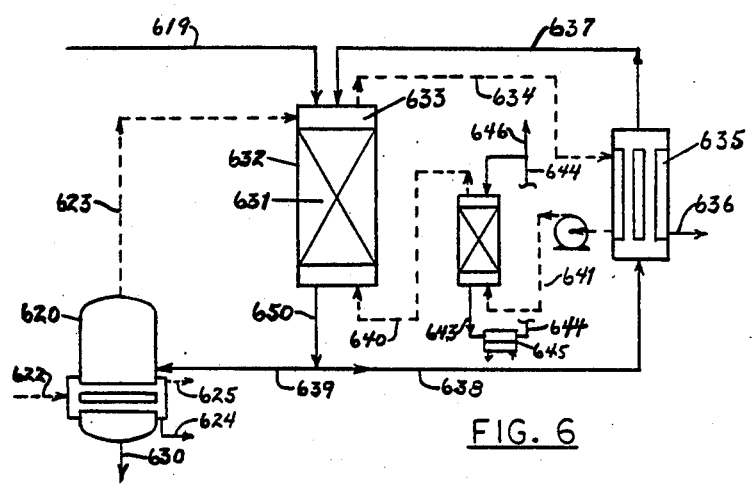

In the embodiment of the invention illustrated in FIG. 1, the system comprises a method or process and apparatus for treating a gaseous flow 110, consisting principally of saturated steam at super-atmospheric pressure and containing other gaseous substances for extracting therefrom hydrogen sulfide contained therein and is particularly but not exclusively adapted for effecting such extraction from such a gaseous flow containing less than 1 molar percent of hydrogen sulfide. Such steams occur as the result of industrial processes or naturally as geothermal steam.

In this embodiment there is provided an aqeuous liquid reaction medium 114 carrying dispersed therein, in solution or suspension, reactant 111 preferably consisting essentially of at least one metal compound, the metal of which is selected from the class of metals having an electrode oxidation potential positive with respect to hydrogen in the electromotive series and capable of undergoing reaction with aqueous hydrogen sulfide to form a solid metal sulfide reaction product, the metal sulfide of which has, at 25° C., a solubility product smaller than $10 \times 10^{-15}$, e.g. compounds of nickel, iron, zinc, etc. Said liquid reaction medium 114 may be provided by mixing said reactant 111 with water 112, and heating and pressurizing the same, in suitable conditioning apparatus 113.

As shown in FIG. 1, the flow of steam 110 is intimately contacted with said aqueous liquid reaction medium 114 in extractor 115 which may be a reactor, occurrent and/or countercurrent, of the wet scrubbing type, e.g. a packed-, tray-, or spray-tower, or a venturi, multiple venturi, or other suitable gas and liquid contact device, arranged, e.g. as shown in FIGS. 1a, 1b, 1c, 1d, or otherwise, it being understood that where separate contacting elements are shown such elements may be contained in a common housing. To inhibit condensation of steam from flow 110 in extractor 115, the liquid reaction medium 114 should be delivered into said extractor at approximately the temperature of the flow of steam 110 therein.

In extractor 115, gaseous hydrogen sulfide from the flow 110 dissolves in the aqueous liquid phase and reacts with reactant from 111 therein to form one or more solid metal sulfide reaction products. This effectively removes dissolved hydrogen sulfide from the aqueous phase and enables additional hydrogen sulfide from the gaseous phase to dissolve therein, progressively, thereby causing the gaseous flow from 110 to become depleted in hydrogen sulfide in extractor 115.

The aqueous reaction medium and non-gaseous products of the reaction in extractor 115 are separated from the gaseous flow and removed as at 116, and the gaseous flow depleted in hydrogen sulfide is delivered from extractor 115 as at 110a.

As is schematically illustrated in FIG. 1, the contacting of the aqueous liquid reaction medium from 114 with the flow of steam from 110 in extractor 115 may be effected in any suitable manner, e.g. the gaseous flow may be bubbled through a batch of the aqueous reaction medium contained in extractor 115 during the process of extraction, or it may pass in cocurrent or countercurrent contact with the flow from 114 to 116 of the aqueous reaction medium. Especially in the latter case, and particularly where only a part of the reactant comprised in the flow from 114 is reacted in the contact before leaving the extractor 115 via 116, the illustrative embodiment contemplates recycling to the contact in extractor 115 via 114a all or a part of the unreacted reactant from 116. This may be effected via valved conduit 118(b), without first separating solid materials therefrom, or via valved conduit 118(c) after separation of solids in separator 117. The aforesaid batch operation may also be carried out with recirculation of the aqueous reaction medium in a similar manner. For continuous operation, the recirculation via 114a may be combined with the flow from 114 and, if desired, all or a portion of the flow from 116 may be delivered via 119 and/or 120 for further treatment as hereinafter described.

Precipitation of solid metal sulfide reaction products in extractor 115 may be aided by dispersing in the liquid aqueous reaction medium finely divided solid particulate matter for acting as substrata for such precipitation, this substrata material being removed from extractor 115 with the precipitated reaction products as at 116. Such substrata material may be added as a slurry to 113, and/or may be carried into extractor 115 by recycle via 114a of a part of the solids in the liquid in 116, or as a constituent of the gaseous flow 110, and/or may be formed in situ in 115 as by reaction of hydrogen sulfide contained in the gaseous flow 110 with a second metal compound, supplied to the aqueous liquid in 115, the metal of which is selected from the subclass having an electrode oxidation potential negative with respect to hydrogen in the electromotive series and the capability of undergoing reaction with aqueous hydrogen sulfide to form a solid second metal sulfide product, e.g. compounds of silver, mercury, arsenic, copper, etc. When a finely divided solid particulate material and/or a second metal compound is a constituent of the gaseous flow 110, such material or compound not only becomes dispersed in the aqueous liquid reaction medium in 115 to provide said substrata, but in addition the gaseous flow withdrawn via 110a becomes depleted in said solid particulate material and/or compound whereby the utility of said gaseous flow is improved for its subsequent use, e.g. for operating steam turbines, or for use in chemical processes. Also when the flow 110 of steam, e.g. geothermal steam, also contains in gaseous form a quantity of substance comprising at least one of the elements of the class consisting of boron, arsenic and mercury, e.g. compounds of boron, arsenic and mercury and/or mercury vapor, at least a part of such substance, depending on its partial pressure and/or its reactivity with constituents of the aqueous liquid reaction medium will become dispersed in said aqueous medium in 115 and be removed as at 116, whereby the resultant steam flow 110a from 115 is also depleted in its content of said gaseous substance.

Still referring to FIG. 1, the non-gaseous metal sulfide reaction products removed from the extractor at 116 are preferably separated from the aqueous liquid medium, as at 117 (although such separation may be omitted, as indicated by the valves 118, 118a in FIG. 1, when the aqueous medium contains no constitutent to be excluded from the subsequent processing illustrated in FIG. 1) and are thereafter passed, as at 120, to reactor 121 where they are treated by adding thereto, via 121a, aqueous acid selected from the class of acids capable of reacting with said at least one metal sulfide to regenerate hydrogen sulfide gas therefrom with formation of metal salt of said acid and hydrogen sulfide. Suitable acids for this purpose are the acids more active than hydrosulfuric acid and non-oxidizing to hydrogen sulfide, e.g. sulfuric, hydrochloric and phosphoric, of which sulfuric is preferred. Following the acid treatment in reactor 121, the regenerated hydrogen sulfide gas may be withdrawn and recovered, as at 122, and the metal salt formed, e.g. metal sulfate, may be withdrawn in, and recovered with or from, the aqueous medium, as at 123.

Where solid particulate matter has been supplied to the aqueous reaction medium via 110 or otherwise as above described and is inert to the said acid treatment, then following such treatment the insoluble residue may be separated in 127 by centrifuging, filtration or other separation means. Where such solid particulate matter is not a constituent of the gaseous flow 110, it may be suitably treated and recycled, as via 129, for reuse as substrata as aforesaid.

The metal salt withdrawn at 123 may be delivered to storage or other use, e.g. via valved outlet 124, or it may be recycled via 125, 127, 129 as a component useful for preparing the aqueous liquid reaction medium 114. In the latter case, as indicated in FIG. 1, where the reactant supplied at 111 is a metal salt and the same metal salt is formed in aqueous solution in reactor 121, such solution may be recycled via the conditioning apparatus 113, as shown at 125-129, with or without concentration or other treatment, as in 127, and used in lieu of a fresh supply of reactant from 111.

Where the reactant supplied at 111, or e.g. at 129 comprises a compound selected from the class consisting of hydrated oxides, hydroxides and carbonates, then the metal salt, e.g. that formed in aqueous solution in reactor 121, may be chemically converted from the water soluble salt e.g. sulfate form to a water dispersible hydroxide or carbonate form by reaction in aqueous solution with an appropriate base, e.g. sodium hydroxide, sodium carbonate, lime, ammonia, or the like, supplied, e.g. at 128 for recycling via 129 to 113, the conversion byproducts formed, e.g. sodium sulfate, calcium sulfate, ammonium sulfate, or the like, being withdrawn, e.g. from 127 as through valved line 126.

In the embodiment of FIG. 1, ammonia may optionally be extracted from the flow of steam 110 before subjecting such flow to extraction of hydrogen sulfide therefrom, in 115, by contacting the flow of steam in a reactor 130 supplied with aqueous acid via 131 to form an aqueous solution of ammonium salt of the acid, the reactor 130, being like the extractor 115 or of any other suitable type and arranged in any suitable manner, e.g. as in FIGS. 1a, 1b, 1c, 1d, or otherwise. This preliminary removal of ammonia may be accomplished by adjusting the valves 108, 109 to pass the ammonia-containing steam flow through 130 before it passes to 115 and enables recovery via 132 of the ammonia from 130 free of sulfide contamination as an ammonium salt of an acid selected from the class of acids which are non-oxidizing to hydrogen sulfide and form a water soluble ammonium salt while in contact with said flow of steam, e.g. sulfuric acid, phosphoric acid, hydrochloric acid, etc., the ammonium salts of the preferred acids being those constituting valuable byproducts, e.g. fertilizer constituents. This procedure also has the advantage that it enables the recovery of metal sulfides from extractor 115 free from influence of ammonia, and enables employment in 115 of a metal salt of an acid different from the acid employed in 130.

As previously mentioned the reactor 130 and/or extractor 115 may be arranged as shown in FIGS. 1a, 1b, 1c, 1d, or otherwise. For brevity, in these figures the same numerals as in FIG. 1 are used for the flow of steam from 110 to 110a and the flow of liquid from 114 to 116 with respect to extractor 115, which may be taken as also typifying reactor 130. Thus, in FIGS. 1a and 1b, element 115 is illustrated as a conventional gas-/liquid contact apparatus, that in FIG. 1a being of the cocurrent type and that in FIG. 1b being of the countercurrent type. In FIG. 1c, element 115 comprises a plurality of separate cocurrent contact means illustrated as 115c-1 and as 115c-2 through which the steam is passed in series from 110 to 110a, the flow of liquid phase from 114 to 116 passing between 115c-1 and 115c-2 cocurrently with the flow of steam therebetween. In FIG. 1d, element 115 comprises a plurality of separate cocurrent contact means illustrated as 115d-1, 115d-2, and 115d-3 through which the steam flow is passed in series from 110 to 110a, the liquid flow from 114 to 116 being passed between 115d-3 and 115d-2 and then between 115d-2 and 115d-1 countercurrently to the flow of steam therebetween.

Particularly advantageous arrangements of cocurrent reactors usable at 115 and 130 are set forth in my copending application Ser. No. 655,239 filed Feb. 4, 1976 entitled "Contact Method and Apparatus for Multiphase Processing" (issued as U.S. Pat. No. 4,062,663, dated Dec. 13, 1977), the disclosure of which is herein incorporated by reference.

In the embodiment of FIG. 2, the liquid aqueous reactant supplied via 214 to extractor 215 to extract hydrogen sulfide and other gases from the steam 210 comprises a liquid aqueous medium carrying a reactant, in solution or dispersion therein, consisting essentially of at least one metal salt of an acid, the metal component of which is selected as described in connection with FIG. 1, and the acid component of which is selected from the class of acids which in aqueous solution are non-oxidizing to hydrogen sulfide, have dissociation constants in aqueous solution greater than that of hydrosulfuric acid ($H_2S$), and form water soluble ammonium salts, the selection preferably being made to contribute the desired acid radical for the ammonium compound to be formed by reaction with ammonia from the steam 210 in the extractor 215. A preferred acid radical in this connection is the sulfuric acid or sulfate radical ($SO_4^{50}$), as ammonium sulfate is a product of value. This liquid aqueous reactant from 214, preferably adjusted in temperature and pressure to conform to those of the steam 210 entering the extractor 215, is brought into intimate contact with the flow of steam 210 in extractor 215 (which may be similar in type and arrangement to 115 of FIG. 1), the insoluble and water soluble materials are removed with the aqueous medium at 216, while the flow of steam depleted in hydrogen sulfide and ammonia content is withdrawn or delivered from the extractor as at 210a. In one embodiment of the invention, when the molar quantity of ammonia contained in the flow of impure steam passing to extractor 215 is in excess of two times the molar quantity of hydrogen sulfide contained therein, a quantity of acid of said class sufficient to react with at least part of but not more than said excess is also contacted with said flow of steam. In another embodiment, when the molar quantity of hydrogen sulfide contained in the flow of impure steam passing to extractor 215 is in excess of one-half the molar quantity of ammonia contained threin, a quantity of basic reagent, e.g., base, sufficient to react with at least a part of but not more than said excess is also contacted with said flow of impure steam.

Still referring to FIG. 2 the insoluble metal sulfide and other solid materials may be separated from the ammonium salt solution withdrawn at 216, as at 217, and the separated ammonium salt solution may be withdrawn via 219 as, or for conversion to, a valuable product of the process. The insoluble metal sulfide solids, withdrawn from 216 with or without separation of liquid therefrom in 217, are delivered at 220, and may be treated to regenerate the metal salt reactant for 214 in any suitable way, e.g. as described in connection with the circuit 125, 127, 129 of FIG. 1.

Of course, in the arrangement of FIG. 2 the supply and removal or recycle of substrata substance with respect to 215 may be employed as described with respect to 115 in FIG. 1. Also, in the arrangement of FIG. 2 the processing of substance comprising boron, arsenic and/or mercury, may be effected as above described with respect to FIG. 1.

In the modification of FIGS. 1 and 2 illustrated in FIG. 3, carbon dioxide contained in the impure steam processed in FIGS. 1 or 2, and/or introduced into the steam in such processing, is removed from the flow of steam to improve its utility as an energy source and/or as a deuterium feed supply for a heavy water concentration process, and to yield as a product of value a substantially pure supply of carbon dioxide.

Referring to FIG. 3, impure steam which has been depleted in hydrogen sulfide or in hydrogen sulfide and ammonia according to the system of FIGS. 1 or 2, and which has been discharged as at 110a of FIG. 1 or at 210a of FIG. 2, is passed via 310 in contact, and preferably countercurrent contact, in carbon dioxide extractor 315 (which may be similar in type and arrangement to 115 of FIG. 1), with an aqueous solution of carbon dioxide binding material from 314, which material is selected from the class consisting of the water soluble materials capable of binding carbon dioxide in said aqueous solution at the temperature and pressure conditions of the contact of the steam therewith in 315. This class of materials is exemplified by the water soluble inorganic bases, e.g. alkali and alkaline earth metal hydroxides, organic amines having at least two carbon atoms, and alkali metal carbonates. Of the said class of carbon dioxide binding materials, those which are capable of releasing the bound carbon dioxide and regenerating the binding material when subjected to an alteration of the said temperature and pressure conditions, as in a regenerator 317, are preferred and enable the released carbon dioxide to be withdrawn via 322 and enable the solution of the binding material to be recycled to the contact in extractor 315 as illustrated by the recycle line 314a leading from the regenerator 317 to the supply line 314a. A conduit 314b may be provided for drawing off of, or supplying make-up to, the solution in 314a. With the arrangements of the processes of FIGS. 1, 2 and 3, contaminant materials in mixture in the steam may be removed separately rather than in admixture. Such separately removed contaminant materials may be in the chemical forms which exist in the steam or in modified chemical forms, e.g. hydrogen sulfide, sulfates, metal sulfide, ammonia, ammonium compounds and carbon dioxide, and each such material when recovered essentially free of contaminants is a valuable byproduct of the overall process.

As above noted, geothermal steam which contains a greater ratio of deuterium to protium than does steam generated from fresh surface waters, may be used in accordance with the present invention to supply deuterium for concentration into heavy water in a heavy water production plant with essentially no detriment to the utility of the steam as an energy source. Thus, as illustrated in FIG. 4, the purified geothermal steam from 410 may be contacted countercurrently in a hydrogen isotope exchanger 415, which may be similar in type and arrangement to FIGS. 1b or 1d, with liquid water of lesser deuterium content essentially free of volatile contaminants and which is supplied to the reactor 415, as via 414, at essentially the same temperature and pressure as those of the steam from 410. Such a water may be the deuterium impoverished water effluent from a heavy water plant which has been freed of dissolved volatile constituents, e.g. the usual deuterium depleted water effluent from a dual temperature exchange heavy water plant which is discharged from the hot tower thereof at about 130° C. and then stripped of volatiles at a higher temperature. The water of lesser deuterium content supplied to 415 via 414 extracts deuterium from the steam from 410 having a greater deuterium content, in exchange for protium, and the water from 415 with its deuterium content so augmented to a concentration not greater than that at equilibrium with said steam from 410, is withdrawn, as at 416, for deuterium feed supply to the heavy water plant while the steam with its so reduced deuterium content is delivered, as at 410a, for further use. Such utilization of steam as a deuterium feed source may be practiced as disclosed in my aforesaid copending application Ser. No. 712,171.

Referring now to FIG. 5, in this embodiment of the system of the invention provision is made for the delivery at 519 to a concentrating system comprising an indirect contact evaporator 520 of a solution of ammonium salt, as from 219 of FIG. 2, where it may be concentrated at a pressure lower than the pressure of the steam at 210a of FIG. 2 by removing substantially salt-free water therefrom. In the system of FIG. 2, the solids separation at 217 may be effected at such lower pressure under control of the valve 218 with valve 218a closed, in which event the ammonium salt solution in 219 may already be reduced to said lower pressure, otherwise throttling valve means 521 in the system of FIG. 5 may be employed to establish the reduced pressure in the evaporator 520. The heating fluid employed for effecting the evaporation in the indirect contact heat transfer section of the evaporator 520 is supplied via 522, preferably being a portion of processed geothermal steam depleted in hydrogen sulfide as from 210a of FIG. 2, which is condensed in the condensing section 523 of the evaporator. The condensate formed in 523 is removed at 524 and preferably delivered to the water supply for forming the aqueous medium delivered as via 214 of FIG. 2, e.g. the water supply 112 of FIG. 1. Inert non-condensable gases and uncondensed residual steam separated from the condensate in the condensation at 523 are removed via 525. The water vapor from the evaporation of the ammonium salt solution in 520 is withdrawn via 526 to a suitable condenser 527 to which coolant is supplied as via 529 and the substantially salt-free condensate withdrawn at 528 is also preferably recirculated at least in part to the water supply for forming the liquid aqueous reaction medium supplied as via 214 of FIG. 2, e.g. via 112 of FIG. 1. The illustrated evaporator 520 and condenser 527 are conventional indirect contact heat exchange systems, but the invention contemplates use of any suitable evaporating and condensing means which enables separation and removal of condensate and freed gases. The concentrated ammonium salt solution, with or without salt crystals therein depending on the degree of evaporation effected, is withdrawn from the evaporator 520, as via line 530, as a useful product, e.g. as a fertilizer material, either directly or after further concentration or crystalization in a separate apparatus or by recycling.

In the form of FIG. 6 the ammonium salt solution 619 to be concentrated and a flow of carrier gas 640 are passed in contact with each other in a first zone, shown as comprised in the contact elements 631 of the contact tower 632, wherein the gas is heated and water is vaporized thereinto. The so heated and humidified gas is then further heated and a further quantity of water vapor is added thereto in a second zone 633, shown as located above the first zone in the tower 632. The flow of gas from 632 via 634 is then cooled and condensate of essentially salt-free water is formed therefrom in a third zone 635, the substantially salt-free water being withdrawn in the form of said condensate from said third zone, as via the condensate outlet 636 shown as passing from the cold end of 635, but which may pass from the hot end, the cold end, or any intermediate location of the third zone, as desired. The heat withdrawn from the gas in the third zone 635 is transferred to said first zone 631 for heating the gas therein, this transfer being effected via a circulation of ammonium salt solution 637, heated by indirect contact with the gas in the heat exchanger 635 and delivered to said first zone. In the form shown this circulation of ammonium salt solution is drawn via 638 from the liquid outlet 650 from the first zone and is recycled through the first zone after being so heated, and a portion of the circulated liquid from 650 is withdrawn via 639 for further concentration by evaporation and crystallization of the ammonium salt in an evaporator 620, e.g. of the types described in connection with evaporator 520 of FIG. 5, from which the further concentrated solution and/or crystals are withdrawn via 630. As shown, the water vapor formed in the evaporation in 620 is passed via 623 to further heat the flow of gas and add the further quantity of water vapor thereto in the second zone 633. The cooled gas 641 from the third zone 635 is further cooled with further condensate being formed therefrom in cooler 642 before it is recirculated to the first zone via 640.

The cooler 642 may be a conventional heat exchanger cooled by coolant, e.g. cold water from an outside source, or as shown it may be a countercurrent direct contact heat exchanger employing a circulation 643–644 of the condensate formed therein which in turn is cooled from an outside source via 645, surplus condensate being removed via 646.

Figure 7:
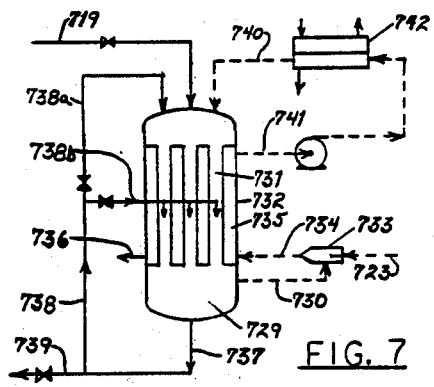

In the form of FIG. 7, the ammonium salt solution 719 to be concentrated and a flow of carrier gas 740 are mixed and passed cocurrently with each other in a first zone, shown as comprised in the tube elements 731 of the indirect contact heat exchanger 732, which may comprise a single unit or a plurality of units connected in series, wherein the gas is heated and water is vaporized thereinto from said solution 719 increasing its concentration of the salt. The so heated and humidified gas is separated from the solution in 729 and said gas delivered via 730 is further heated and a further quantity of water vapor is added thereto in a second zone, e.g. by steam injector 733 therein supplied with steam via 723. The flow of further heated and humidified gas passed from said second zone via 734 is then cooled and condensate of essentially salt-free water is formed therefrom in a third zone 735, shown as the shell side of said heat exchanger 732, wherein the flow of gas being cooled is countercurrent to the flow of liquid and gas being heated in the tube side 731, the substantially salt-free water being withdrawn in the form of said condensate from said third zone, as via the condensate outlet 736 shown as passing from the hot end of the third zone 735 but which may pass from the hot end, the cold end or any intermediate location of the third zone as desired. The heat withdrawn from the gas in the third zone 735 is transferred by conduction to the first zone 731 for heating the gas and liquid therein. The concentrated ammonium salt solution separated from the gas in 729 is withdrawn via 737 and in whole or in part may be recycled via 738 through all or part of the first zone 731 via 738a and/or 738b, and all or part of the concentrated salt solution or salt slurry from 737 may be withdrawn via 739 for further concentration or crystallization in an evaporator such as 620 of FIG. 6 if desired. Steam from an external source, or the water vapor from such evaporation adjusted if necessary in pressure, is delivered via 723 for employment in the steam injector 733. The cooled gas 741 from the third zone 735 is further cooled with further condensate being formed therefrom in cooler 742 before it is recirculated to the first zone via 740.

The cooler 742 may be a conventional heat exchanger cooled by coolant, e.g. cooling water from an outside source, or may be a countercurrent direct contact heat exchanger employing a circulation of the condensate formed therein which in turn is cooled from an outside source, e.g. of the type shown at 640–645 of FIG. 6.

Figure 8:
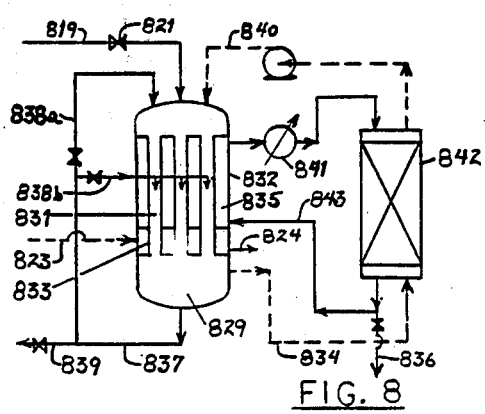

In the form of FIG. 8, the ammonium salt solution 819 to be concentrated and a flow of carrier gas 840 are mixed and passed cocurrently with each other in a first zone, shown as comprised in the tube elements 831 of the indirect contact heat exchanger 832, which may comprise a single unit or a plurality of units connected in series, where the gas is heated and water is vaporized thereinto from said solution 819 increasing its concentration of the salt. The so heated and humidified gas is further heated and a further quantity of water vapor is added thereto from said salt solution in a second zone 833 by indirect contact with a heat exchange fluid, e.g. hot liquid or steam therein, supplied via 823 and the gas is thereafter separated from the solution in 829. When steam is used in 823 the condensate therefrom is separately removed via 824. The flow of further heated and humidified gas passed from said separator 829 via 834 is then cooled and condensate of essentially salt-free water is formed therefrom in a third zone 842. This cooling and condensation is effected by direct contact heat transfer with a recirculating countercurrent flow of the condensate formed in said third zone which recirculation in turn is cooled and transfers its heat to the first zone by being passed from 842 via 843 to the shell side 835 of said heat exchanger 832 in countercurrent relation to the liquid and gas passing in said first zone. The condensate formed in this third zone 842 is withdrawn as substantially salt-free water, as via the condensate outlet 836 shown as passing from the hot end of the third zone 842 but which may pass from the hot end, the cold end or any intermediate section of the third one as desired.

The concentrated ammonium salt solution separated from the gas in 829 is withdrawn via 837 and in whole or in part may be recycled via 838 through all or part of the first zone 831 via 838a and/or 838b, and all or part of the concentrated salt solution or salt slurry from 837 may be withdrawn via 839 for further concentration or crystallization in an evaporator such as 620 of FIG. 6 if desired. Steam from an external source, or the water vapor from such evaporation adjusted if necessary in pressure, is delivered via 823 for employment in the indirect contact steam heater 833. The cooled circulation of condensate passing from heat exchanger 832 is further cooled in indirect contact heat exchanger 841 which is supplied with coolant from an external source and such further cooling of the recirculation serves to further cool and condense vapor from the gas passing in the third zone 842 before it is passed via 840 to the first zone.

Figure 9:
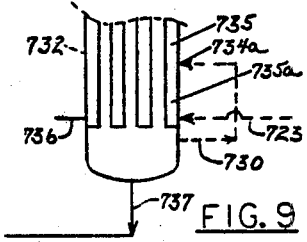

In the modification of FIG. 7 shown in FIG. 9, all elements are the same as in FIG. 7 except that the steam 723, instead of mixing with the gas supplied via 733 from separator 729 as in FIG. 7, is separately supplied to a section 735a of the shell side of heat exchanger 732 preceding the third zone 735 which commences at the pont 734a in the shell side of 732 where the gas from 730 is introduced. The arrangement of FIG. 9 is advantageous when the steam via 723 is derived from a source at a pressure only slightly above the pressure in the third zone 735 since it eliminates the need for providing higher pressure steam as would be required by the arrangement of FIG. 7.

Figure 10:
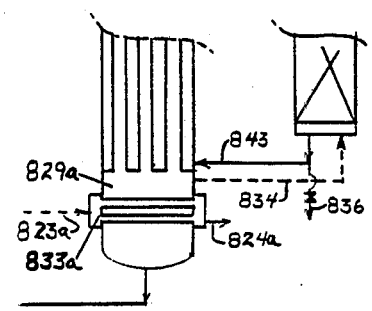

In the modification of FIG. 8 shown in FIG. 10, all elements are the same as in FIG. 8 except that the gas which has been heated and humidified in the first zone is separated from the liquid solution of salt in a separator 829a and further heating and humidification of the gas occurs indirectly by vaporization from the liquid solution which is further heated via indirect contact heat exchanger 833a supplied via 823a with heating fluid, e.g. hot liquid or steam. The cooled liquid or condensed steam is removed via 824a. In this embodiment, as in FIG. 8, since the heating fluid transfers its energy by indirect contact heat exchange it is not necessary for the pressure of the heating fluid to be as great as the total pressure of the mixed gases in the second zone, as long as the temperature of the heating fluid is sufficiently high to transfer heat to the salt solution.

While there have been described herein what are at present considered preferred embodiments of the invention, it will be obvious to those skilled in the art that modifications, including changes, omissions and substitutions, may be made without departing from the essence and principle of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A process for controlling pollution of the environment by discharges from a system which utilizes a flow of steam at superatmospheric pressure, said steam being from a source of superatmospheric pressure and containing minor amounts of noncondensable gases including hydrogen sulfide as impurities therein, which process comprises:

(a) providing an aqueous liquid phase containing reactant dispersed therein, said reactant comprising at least a metal compound having the capability of undergoing reaction with aqueous hydrogen sulfide at the temperature and in the presence of said flow of steam to form a solid metal sulfide reaction product suspended in said liquid, said metal sulfide having a solubility product, a 25° C., smaller than $10 \times 10^{-15}$, (b) contacting at elevated temperature and superatmospheric pressure said flow of impure steam with said aqueous liquid to extract hydrogen sulfide from said impure steam by transferring the same into said liquid and effecting said reaction with hydrogen sulfide therein at said elevated temperature, (c) delivering from step (b) the resultant aqueous liquid and solid reaction product and the resultant flow of steam, at substantially said elevated temperature and superatmospheric pressure, containing noncondensable gases but depleted in hydrogen sulfide, and (d) making the aforesaid discharges from said system to the environment from said resultants delivered in step (c), whereby such discharges are substantially free of hydrogen sulfide.

2. A process according to claim 1, wherein said metal compound is an iron compound.

3. A process according to claim 1, wherein said metal compound is a ferrous compound.

4. A process according to claim 1, wherein said metal compound is a zinc compound.

5. A process according to claim 1, wherein said metal compound is a copper compound.

6. A process according to claim 1, wherein said metal compound is a sulfate.

7. A process according to claim 1, wherein said reactant consists essentially of both an iron compound and another metal compound.

8. A process according to claim 7, wherein said iron compound is a ferrous compound.

9. A process according to claim 7, wherein said other metal is zinc.

10. A process according to claim 7, wherein said other metal is copper.

11. A process according to claim 1 in which in step (b) said steam and liquid flows are passed in cocurrent contact.

12. A process according to claim 1 in which in step (b) said steam and liquid flows are passed in countercurrent contact.

13. A process according to claim 1, wherein the metal compound in step (a) is from the class of metal compounds consisting of hydrated oxides, hydroxides and carbonates.

14. A process according to claim 1, wherein said flow of impure steam is geothermal steam.

15. A process according to claim 1, wherein said impure steam contains a quantity of substance comprising at least one of the elements of the class consisting of boron, arsenic and mercury, at least a part of which substance becomes dispersed in said liquid phase during said contact in step (b), whereby said flow of steam delivered in step (c) is also depleted in its content of said substance.

16. A process according to claim 1, wherein a basic reagent other than said metal compound is contacted in step (b) with said flow of impure steam.

17. A process according to claim 16, wherein said basic reagent is a source of ammonium hydroxide.

18. A process according to claim 17, wherein said metal compound is a sulfate and ammonium sulfate is formed in step (b).

19. A process according to claim 16, wherein said basic reagent consists essentially of lime.

20. A process according to claim 19, wherein said metal compound is a sulfate and calcium sulfate is formed in step (b).

21. A process according to claim 20, wherein said metal compound is ferrous sulfate.

22. A process according to claim 16, wherein said reactant in step (a) comprises a metal salt and said basic reagent.

23. A process according to claim 16, wherein said metal compound in step (a) is from the class of compounds consisting of hydrated oxides, hydroxides and carbonates.

24. A process according to claim 22, wherein said metal salt is a sulfate, said basic reagent is lime and calcium sulfate is formed therefrom.

25. A process according to claim 24, wherein said metal salt is ferrous sulfate.

26. A process according to claim 1, wherein said metal compound is soluble in said aqueous liquid phase, said process further comprising:
(e) in step (c), separating aqueous liquid containing unreacted reactant from the solid reaction product, and
(b) recycling said aqueous liquid separated in step (d) to said contact in step (b).

27. A process according to claim 1, said process further comprising:
(e) treating said metal sulfide reaction product delivered in step (c) to form said metal compound, and
(f) recycling said metal compound formed in step (d) to said contact in step (b).

28. A process according to claim 1, in which steam delivered from step (c) is discharged into the environment.

29. A process according to claim 1, which further comprises:
(e) condensing liquid water from said steam delivered in step (c),
(f) discharging from step (e) liquid water condensate substantially free of hydrogen sulfide, and
(g) discharging from step (e) noncondensable gases and uncondensed steam substantially free of hydrogen sulfide.

30. A process according to claim 29, wherein the liquid aqueous reaction medium provided in step (a) contains an amount of reactant exceeding the stoichiometric equivalent of the hydrogen sulfide contained in the gaseous flow of steam to be reacted therewith in step (b).

31. A process according to claim 30, wherein the stoichiometric ratio of said reactant in the liquid reaction medium to the hydrogen sulfide in said gaseous flow of steam is not less than 2.

32. A process according to claim 29, wherein in step (b) said flow of steam and liquid are contacted in a plurality of separated cocurrent contact steps through which said flow of steam is passed in series.

33. A process according to claim 29 in which in said contact of step (b) only a part of the content of said reactant dispersed in said aqueous liquid phase is reacted with hydrogen sulfide and after said contact the liquid phase contains unreacted reactant, said process further comprising:
(h) recycling at least a part of said unreacted reactant to form at least a portion of said content of reactant.

34. A process as claimed in claim 33, wherein said reactant is soluble in said aqueous liquid phase, said process further comprising:
(i) in step (c), separating liquid phase containing unreacted reactant from the solid phase, and
(j) in step (h), recycling said separated liquid phase containing unreacted reactant.

35. A process according to claim 29, said process further comprising:
(h) treating said metal sulfide reaction product separated in step (c) with aqueous acid capable of reacting therewith to regenerate hydrogen sulfide gas and form metal salt of said acid and said metal, and
(i) separately removing said regenerated hydrogen sulfide gas and said metal salt.

36. A process according to claim 35, wherein said metal salt is removed in aqueous solution.

37. A process according to claim 35, said process further comprising:
(j) employing metal salt removed in step (i) as a source for reactant provided in step (a).

38. A process according to claim 37, wherein said metal compound referred to in step (a) consists essentially of metal salt which is the same as the metal salt removed in step (i).

39. A process according to claim 37, wherein the said one metal compound referred to in step (a) is selected from the class of metal compounds consisting of hydrated oxides, hydroxides and carbonates, said process further comprising:
(k) providing at least a part of said selected metal compound by chemical conversion from said metal salt removed in step (i).

40. A process according to claim 35, said process further comprising:
(j) removing aqueous liquid from said metal sulfide reaction product separated in step (c) before the treatment thereof in step (h).

41. A process according to claim 29, which further comprises:
(h) dispersing in said aqueous liquid phase finely divided solid particulate matter forming substrata for precipitation of said metal sulfide reaction product in step (b).

42. A process according to claim 41, wherein said dispersed substrata comprises a second metal sulfide the metal of which has an electrode oxidation potential with respect to hydrogen in the electromotive series opposite to the electrode oxidation potential of the said one metal compound.

43. A process according to claim 41, wherein said flow of steam to step (b) carries suspended therein a quantity of finely divided solid particulate matter which becomes dispersed in said liquid phase as said substrata during said contact in step (b), whereby said contacted flow of steam separated in step (c) is also depleted in said carried solid particulate matter.

44. A process according to claim 29, wherein said flow of steam also contains ammonia, which process further comprises:
(h) prior to step (b), contacting said flow of steam with an aqueous solution of an acid selected from the class of acids which are non-oxidizing to hydrogen sulfide and form with aqueous ammonia an ammonium salt essentially non-volatile at the temperature of said flow of steam for causing said flow of steam to become depleted in ammonia, and (i) passing to step (b) said flow of steam depleted in ammonia.

45. A process according to claim 44, wherein said acid consists essentially of phosphoric acid, and said ammonium salt consists essentially of ammonium phosphate.

46. A process according to claim 44, wherein said acid consists essentially of sulfuric acid, and said ammonium salt consists essentially of ammonium sulfate.

47. A process according to claim 29, wherein said flow of impure steam to step (b) also contains ammonia and in step (a) said reactant comprises a metal salt of an acid which acid in aqueous solution is non-oxidizing to hydrogen sulfide and has a dissociation constant greater than that of hydrosulfuric acid ($H_2S$), which metal salt also reacts in step (b) with said ammonia to form an ammonium salt in said aqueous liquid phase, whereby the flow of steam separated in step (c) is depleted in both hydrogen sulfide and ammonia.

48. A process as claimed in claim 47, wherein said metal salt is a metal sulfate.

49. A process as claimed in claim 47, wherein the molar quantity of said ammonia contained in said flow of impure steam to step (b) is in excess of two times the molar quantity of hydrogen sulfide contained therein.

50. A process according to claim 39, wherein said reactant consists essentially of both said metal salt and said acid.

51. A process according to claim 49, wherein a quantity of said non-oxidizing acid in aqueous solution sufficient to react with at least a part of said excess is also contacted with said flow of steam.

52. A process according to claim 47, wherein the molar quantity of hydrogen sulfide contained in said flow of impure steam to step (b) is in excess of one-half the molar quantity of said ammonia therein, in which process a molar quantity of basic reagent equal to at least a part of said excess is also contacted with said flow of steam.

53. A process according to claim 52, wherein said reactant referred to in step (a) consists essentially of both said metal salt and said basic reagent.

54. A process according to claim 52, wherein said basic reagent is a source of ammonium hydroxide.

55. A process according to claim 53, wherein said basic reagent comprises at least one metal compound referred to in step (a) is selected from the class of compounds consisting of hydrated oxides, hydroxides and carbonates.

56. A process according to claim 53, wherein said basic reagent comprises a compound of the metal of said metal salt.

57. A process according to claim 47, wherein said ammonium salt is in solution in said aqueous liquid phase, which process further comprises:

(h) after step (c), separating the metal sulfide reaction product from the ammonium salt solution.

58. A process according to claim 57, which process further comprises:

(i) reacting metal sulfide removed in step (i) for causing said metal salt to be formed, (j) separating said metal salt formed in step (b), and (k) recycling said separated metal salt to comprise at least a part of said at least one metal compound in step (a).

59. A process according to claim 57, which process further comprises:

(i) concentrating said ammonium salt solution separated in step (h) by removing substantially salt-free water therefrom.

60. A process according to claim 59, wherein at least a part of said substantially salt-free water is recirculated for inclusion in said aqueous liquid phase referred to in step (a).

61. A process according to claim 57, wherein metal sulfide reaction product from step (g) comprises metal of the class having an electrode oxidation potential positive with respect to hydrogen in the electromotive series, which process further comprises:

(i) reacting sulfide removed in step (d) in an aqueous solution of said acid for causing hydrogen sulfide and said metal salt to be formed, (j) separating said hydrogen sulfide and said metal salt, and (k) recycling said separated metal salt to comprise at least a part of said at least one metal compound in step (a).

62. A process according to claim 29, wherein said contacted flow of steam separated in step (c) contains carbon dioxide, which process further comprises:

(h) passing said separated flow of steam in contact with an aqueous solution of material selected from the class consisting of the water soluble materials capable of binding carbon dioxide in aqueous solution at the temperature and pressure conditions of said contact, and (i) withdrawing the flow of steam contacted in step (h) depleted in carbon dioxide.

63. A process according to claim 62, wherein said selected material is capable of releasing carbon dioxide bound in step (h) under temperature and pressure conditions other than those of said contact in step (g), which process further comprises:

(j) subjecting said contacted aqueous solution from step (h) to an alteration of temperature and pressure conditions sufficient to cause carbon dioxide gas to be released therefrom for regenerating said material, (k) removing said released carbon dioxide gas, and (l) recycling said aqueous solution of said regenerated material to said contact in step (h).

64. A process according to claim 63, wherein said selected material comprises a potassium carbonate.

65. A process according to claim 1, wherein said reactant consists essentially of at least one metal compound the metal of which is selected from the class of metals having an electrode oxidation potential negative with respect to hydrogen in the electromotive series.

66. A process according to claim 1, wherein said reactant consists essentially of at least one metal compound the metal of which is selected from the class of metals having an electrode oxidation potential positive with respect to hydrogen in the electromotive series.

67. A process according to claim 29, wherein said steam delivered in step (c) is utilized as an energy source.

68. A process according to claim 67, wherein said steam delivered in step (c) is utilized to provide heat energy.

69. A process according to claim 67, wherein said steam is delivered in step (c) utilized to provide mechanical energy.

* * * * *

UNITED STATES PATENT OFFICE
CERTIFICATE OF CORRECTION

PATENT NO. : 4,202,864  
DATED : May 13, 1980  
INVENTOR(S) : Jerome S. Spevack

It is certified that error appears in the above-identified patent and that said Letters Patent are hereby corrected as shown below:

In Column 1: line 25, for "consisting" read --constituting--;  
             line 51, for "relates" read --related--;  
             line 60, for "dischaging" read --discharging--.

In Column 2: line 24, for "other" read --. Other--;  
             line 29, for "mental" read --ment--;  
             line 31, for "stem" read --steam--;  
             line 36, for "or said" read --of said--;  
             line 43, for "heating" read --in heating--;  
             line 53, for "is" read --are--.

In Column 4: line 43, for "optical" read --optional--.

In Column 5: line 16, for "aqeuous" read --aqueous--;  
             line 33, for "oc" read --co--.

In Column 6: line 6, for "118(b)" read --118b--;  
             line 7, for "118(c)" read --118c--.

In Column 7: line 31, for "129" read --129,--;  
             line 36, for "salt" read --salt,--;  
             line 36, for "form" read --, form--.  
             line 38, for "solution" read --solution, e.g. in 127,--

In Column 8: line 48, for "$(SO_4^{50})$" read --$(SO_4^=)$--;  
             line 68, for "thrėin" read --therein--.

In Column 10: line 22, for "nigher" read --higher--;  
             line 28, for "410," read --410--.

In Column 13: line 65, for "of" read --at--.

In Column 14: line 8, for "a 25°" read --at 25°--.

UNITED STATES PATENT OFFICE
CERTIFICATE OF CORRECTION

PATENT NO. : 4,202,864
DATED : May 13, 1980
INVENTOR(S) : Jerome S. Spevack

It is certified that error appears in the above-identified patent and that said Letters Patent are hereby corrected as shown below:

In Column 15: line 31, for "(b)" read --(f)--;
                 line 31, for "(d)" read --(e)--;
                 line 37, for "(d)" read --(e)--.

In Column 16: line 55, for "compound" read --compound referred to in step (a)--.

In Column 17: line 31, for "39" read --49--;
                 line 52, for "(a) is" read --(a)--;
                 line 66, for "(i)" (2nd occurrence) read --(h)--;
                 line 68, for "(b)" read --(i)--.

In Column 18: line 13, for "(g)" read --(h)--;
                 line 17, for "sulfide" read --metal sulfide--;
                 line 17, for "removed" read --separated--;
                 line 17, for "(d)" read --(h)--;
                 line 38, for "(g)" read --(h)--;
                 line 66, for "steam is" read --steam--;
                 line 66, for "(c)" read --(c) is--.

Signed and Sealed this

Second Day of March 1982

[SEAL]

Attest:

GERALD J. MOSSINGHOFF

Attesting Officer      Commissioner of Patents and Trademarks